Oct. 25, 1960 R. NYSTAD ET AL 2,957,251
EDUCATIONAL JIGSAW GLOBE PUZZLES
Filed Dec. 24, 1958 3 Sheets-Sheet 2
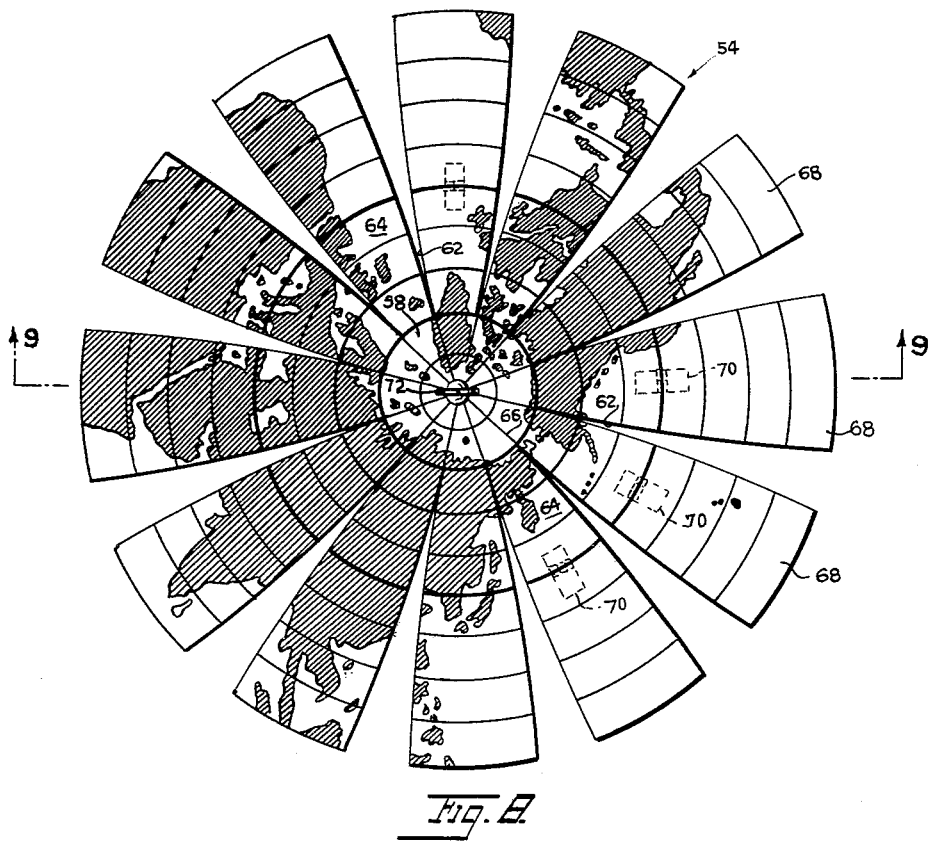
Fig. 8.
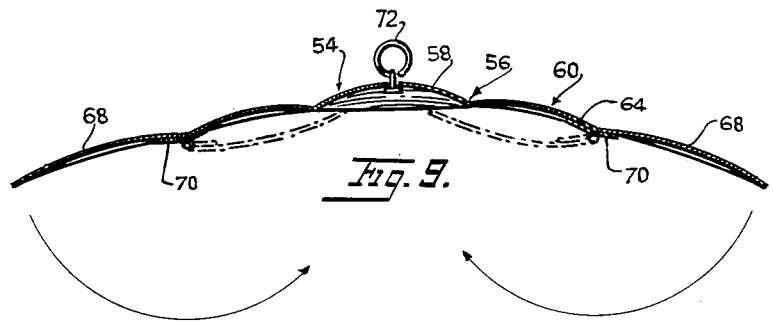
Fig. 9.
INVENTORS.
RUTH NYSTAD
HARRY NYSTAD
BY
ATTORNEY Oct. 25, 1960  R. NYSTAD ET AL  2,957,251
EDUCATIONAL JIGSAW GLOBE PUZZLES
Filed Dec. 24, 1958  3 Sheets-Sheet 3

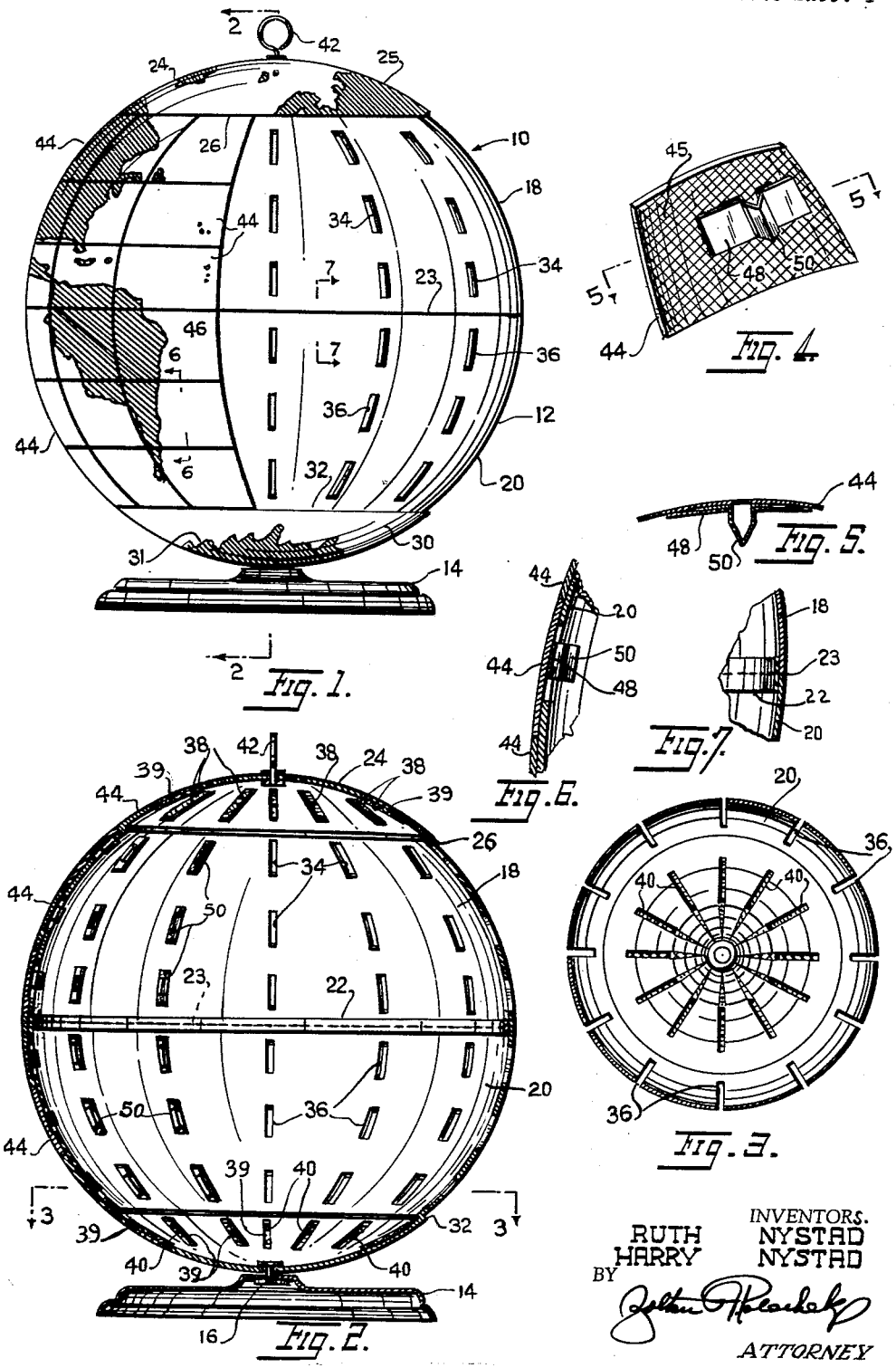

INVENTORS.
RUTH NYSTAD
HARRY NYSTAD
BY
*ATTORNEY*

United States Patent Office 2,957,251
Patented Oct. 25, 1960

2,957,251

EDUCATIONAL JIGSAW GLOBE PUZZLES

Ruth Nystad and Harry Nystad, both of 453 W. Penn St., Long Beach, N.Y.

Filed Dec. 24, 1958, Ser. No. 782,900

5 Claims. (Cl. 35—46)

Our invention relates to a puzzle map game and more particularly to a jigsaw puzzle apparatus of this class in the form of a sphere or globe of the world.

It is the primary object of the present invention to provide a jigsaw globe puzzle that is educational and entertaining.

Another object of the invention is to provide a jigsaw globe puzzle of this class for educational purposes whereby the study of geography is made more interesting and may be taught or practiced in the form of a competitive game.

A further object is to provide a jigsaw map puzzle in the form of a globe whereby the student may be more easily taught geographic locations relative to the longitude and latitude of the globe.

Still another object is to provide a jigsaw map puzzle in the form of a globular frame at the outer side of which is adapted to be variously positioned and supported map sections in shell form.

It is also an object of the invention to provide in a puzzle of this kind a spherically shaped frame of this class whereby shell sections, representing various geographic localities, may be detachably secured, by a suitable securing means, to their respective positions on the body of the globe.

It is a further object of the invention to provide a novel educational apparatus for teaching and learning geography.

An important object of the invention is to provide an educational and entertaining jigsaw globe puzzle of this type that is simple and rugged in construction and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a jigsaw globe puzzle embodying our invention, showing certain of the playing pieces or map segments in proper position and the puzzle partially solved.

Fig. 2 is a vertical sectional view taken on the plane of the line 2—2 of Fig. 1.

Fig. 3 is a horizontal sectional view taken on the plane of the line 3—3 of Fig. 2.

Fig. 4 is a perspective rear view of one of the geographical segments or playing pieces.

Fig. 5 is a sectional view taken on the plane of the line 5—5 of Fig. 4.

Fig. 6 is a vertical sectional view taken on the plane of the line 6—6 of Fig. 1.

Fig. 7 is a vertical sectional view taken on the plane of the line 7—7 of Fig. 1.

Fig. 8 is a top plan view of a pattern device used with the globe puzzle.

Fig. 9 is a horizontal sectional view taken on the plane of the line 9—9 of Fig. 8.

Figure 10:
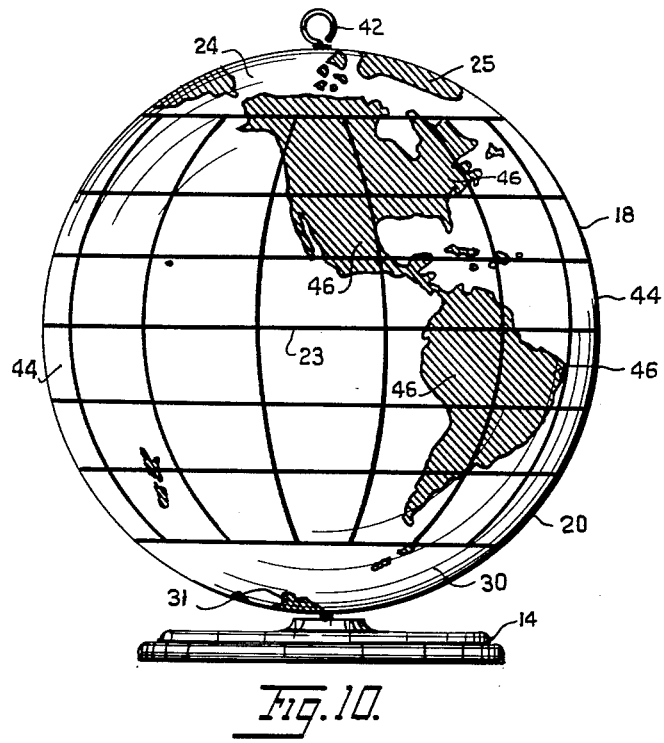
Fig. 10 is a view similar to Fig. 1 showing all of the playing pieces or segments in proper position and the puzzle solved.
Figure 12:
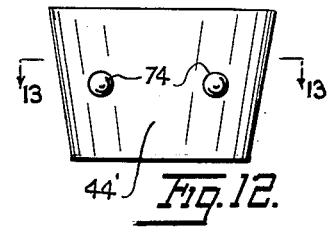
Fig. 12 is a rear elevational view of one of the geographical playing pieces or segments.
Figure 13:
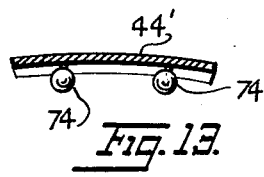
Fig. 13 is a sectional view taken on the plane of the line 13—13 of Fig. 12.

Referring in detail to the drawings, in Fig. 1 a jigsaw globe puzzle made in accordance with the first form of my invention is shown and designated by the reference numeral 10. The puzzle is in the form of a globe 12 of the earth, or, as commonly referred to, the world. The globe as a whole is supported on a suitable circular base 14 and rotates on a pin 16 fixed in the base and extending axially through the globe.

The globe 12 is formed of two semispherical sections or shells, an upper shell section 18 and a lower shell section 20, formed of suitable light metal material, such as aluminum, but may be made of plastic or any other suitable material. A plastic ring 22 is secured to the inner surface of the lower section 20 along its upper edge and protrudes slightly above said edge providing a guide for assembling the sections and a support for the upper shell section 18 when seated on the upper edge of the lower shell section 20.

The dividing line between the upper and lower sections or shells is disposed along the equator of the earth as indicated at 23. Around the area at the top of the upper section 18 representing the north polar or arctic polar region of the earth, a plate 24 is permanently secured thereto by welding, adhesive or in any other suitable manner. The plate is formed as a first section of a sphere or world map. A map of the north polar or arctic geographical regions is secured over the top surface of said plate as indicated at 25. The peripheral edge 26 of the plate with the map thereon protrudes slightly beyond the outer periphery of the section 18 of the globe.

A similarly formed plate 30 is permanently secured around the area at the bottom of the lower section 20 that represents the south polar or antarctic polar region of the earth. This plate is formed as a second section of a world map. A map of the south polar or antarctic geographical regions is secured over the top surface of said plate 30 as indicated at 31. The peripheral edge 32 thereof protrudes outwardly of the outer periphery of the lower section 20 of the globe.

The upper and lower sections 18 and 20 are formed with a plurality of vertically and horizontally spaced elongated rectangular-shaped vertically disposed slots 34 and 36 radiating from the north pole and from the south pole, respectively, along vertical curved lines in simulation to the lines of longitude of a map of the world.

Underneath the upper shell section 24 at the arctic polar region in line with and visible through the uppermost slots 34 there are strips 38 of plastic or other suitable material suitably colored, each strip having a color in contrast to the colors of the other strips, and being seated in a recess 39 in section 24. Similar strips 40 of contrasting colors are similarly seated in recesses inside lower shell section 30 at the antarctic polar region in line with and visible through the lowermost slots 36.

A metal ring 42 secured to the top of the globular section 18 and protruding thereabove serves as a handle for carrying the globe.

The foregoing comprises the permanent structure of the jigsaw globe puzzle.

For use with the globular or shell sections 18 and 20, there is provided a plurality of map sections or segments 44, constituting playing pieces, in the form of shells slightly curved and substantially rectangular in elevation as seen in Fig. 4. The segments constitute third sections of a sphere or world map. Printed on the front face of each segment is a map of a section or region of the earth, as indicated at 46. On the rear face of each segment 44, there is a fastening element comprising a rectangular plate or strip 48 of spring metal, bent midway its ends to provide a spring clip 50, the clip being formed with a tapering body. The fastening element is fastened to the rear face by adhesive, welding or the like and the elements are fastened at different areas in the various segments. The rear face of each segment 44 is colored with a solid color as indicated at 45 to correspond with the color of one of the strips 38 or 40. A number of segments are provided with the same color, that is a number of segments are colored pink, a number are colored yellow and the like corresponding to the colors of the strips 38 and 40 and the colors on the world map sections. A sufficient number of segments or playing pieces 44 are provided to complete the picture of the map of the world, a portion of which is shown in Fig. 10.

For use in solving the puzzle or playing the game, a pattern device or guide device 54 is provided. This device 54 comprises a plate-like body 56 of light weight metal such as aluminum, or of plastic material, or other suitable material. The plate is circular in plan and is formed with a central slightly arched or dome-shaped area indicated at 58 and outwardly of the periphery of the area 58 the plate is formed with another slightly raised or arched area indicated at 60 and comprising a greater area than the area 58. The diameter of the area 60 is considerably less than the diameter of the lower globe or shell section 20. The material of the area 60 is formed with radial slits 62 extending from the periphery of area 58 to the periphery of area 60, dividing the area 60 into segments 64. The slits are cut along the lines representing the lines of longitude of a map of the world and the slits are continued in the form of printed lines 66 through the area 58 to the north pole. Hingedly connected to each segment 64, there is a segment 68 of a plate, substantially rectangular in plan and slightly curved. The segments 68 constitute extensions of the segments 64. The hinged connection comprises a strip of adhesive tape 70 having one end secured to the inner surface of the segment 64 and the other end to the inner surface of the adjacent segment 68 so that the segment plates 68 may be folded into collapsed condition underneath the segments 64, as shown in dotted lines in Fig. 9. When the segment plates 68 are in folded collapsed condition, the device fits inside the lower shell section 20 of the globe for storage. A protruding ring 72 secured to the center of the curved area 58 of the plate serves as a handle.

The top surface of the plate 56 including the hinged outer plate segments 68 is printed with the map of the world, the various countries preferably being of contrasting colors. With the color scheme of the map on the plate 56 in conjunction with the colored strips 38 and 40 on the globe sections, the player is greatly assisted in the solution of the puzzle.

In solving the puzzle, that is in assembling the playing pieces in jigsaw style in order to complete the map of the world as shown in Fig. 10, the permanent segments 24 and 30 serve as key pieces or portions. With such permanent segments 24 and 30 as initial guides, the player inspects the guide device 54, the device being in flattened out condition as shown in Figs. 8 and 9, to ascertain the configuration and color of the particular geographical region or area needed. The player, knowing the color of the region desired, inspects the colors on the strips 38 and 40 and then selects a playing piece or segment 44 from the pile of such playing pieces of the corresponding color on the rear surface thereof, and inserts the playing piece into the required slot 34 or 36, indicated by the color of the strip 38 or 40, by means of the clip 50 on the rear surface of the playing piece. If the inserted playing piece fits the requirements, it is left inserted and if not it can readily be withdrawn and another playing piece tried out, in jigsaw style. When all of the playing pieces or segments 44 have been mounted in their proper positions on the globe sections, the final result is as shown in Fig. 10, the puzzle is solved and the game is won. When the playing pieces are in inserted position in the slots, said playing pieces are flush with or in the same plane as the fixed portions 24 and 30.

The modified form of puzzle shown in Figs. 11 to 14, inclusive, differs from the form of Figs. 1 to 9, inclusive, in that the slots in the globe sections, only the slots 36' in the lower globe or shell section 20' being shown, are of dumbbell shape, with one circular end opening larger than the other. The slots of each pair are disposed horizontally as viewed in Fig. 11 instead of vertically as shown in Fig. 1. The slots 36' are arranged in pairs horizontally disposed with the larger circular end openings of the slots opening towards each other. The pairs of slots are spaced vertically and horizontally radiating from the north pole and from the south pole, respectively, along vertically curved lines similar to the slots 36 of the form of Fig. 1.

For use with this shape and arrangement of slots 36', the map section or segment 44' of substantially rectangular shape has a flexible body and is provided with a pair of spaced headed pins 74, the spacing between the pins being similar to the spacing between the smaller circular end openings of the slots of each pair of slots 36'. In mounting the map segment, the ends of the body of the segment are grasped by the fingers of the player and squeezed or pressed toward each other until the spacing between the headed pins is equal to the spacing between the larger circular end openings of the slots 36' whereupon the headed pins are inserted through the larger openings in the slots. Upon release of the squeezing pressure, the body of the segment automatically returns to its normal condition carrying the headed pins into the smaller circular end openings of the slots, the edge walls of the smaller openings preventing any accidental displacement of the map segment.

In all other respects, the jigsaw globe puzzle shown in Figs. 11 to 14, inclusive, is similar to the puzzle shown in Figs. 1 to 10, inclusive, and similar reference numerals are used to indicate similar parts.

Figure 15:
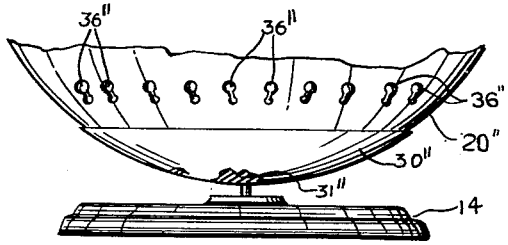
Fig. 15 is a view similar to Fig. 10 of another modified form of slot for mounting the playing pieces or segments.
Figure 14:
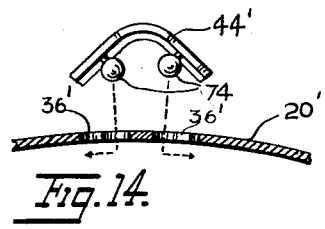
Fig. 14 is a detail view showing a map section in squeezed condition for insertion in the slots of the globe.
Figure 11:
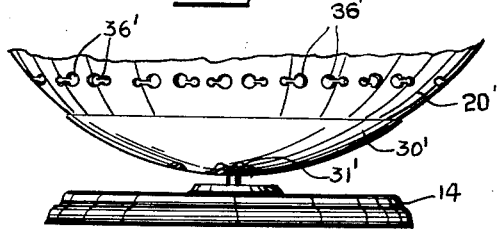
Fig. 11 is a fragmentary view similar to Fig. 1 of a modified form of jigsaw globe puzzle.

The modification of the globe puzzle shown in Fig. 15 is similar to the form of Figs. 11 to 14, inclusive, except that the dumbbell-shaped slots 36" of each pair of slots, in the globe or shell section, such as shell section 20", are arranged vertically instead of horizontally as in the form of Fig. 11. In using the map segments with this form of slot arrangement, the headed pins on the map segments are inserted through the large circular-shaped end openings of the slots 36" and are moved downwardly to the small circular-shaped end openings where they are held against accidental displacement.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A jigsaw globe puzzle comprising a spherical sectioned shell constituting a globe, said shell having series of spaced slots therein, the series of slots being arranged along vertically disposed curved lines constituting the lines of longitude of a map of the world, a first world map section formed as a section of a sphere and forming one end of the shell, the map of said first section being colored in various colors, a second world map section formed as a section of a sphere and forming the other end of the shell, the map on said second section being colored in various colors, third world map sections formed as sections of a sphere adapted to be detachably supported on the outer periphery of said shell between said first and second sections for completing the world map, the maps on said last-named third world map sections being colored in various colors, headed pins carried in spaced relation on said third last-named world map sections insertable into the slots in said shell for detachably fastening said world map sections onto the shell, and colored strips seated inside the first and second map sections and visible through the slots therein, the colors of said strips corresponding to the colors of the maps on the world map sections.

2. A jigsaw globe puzzle as defined in claim 1, wherein the slots in the shell have dumbbell shapes and are vertically disposed with a larger circular opening at the top of the slot and a smaller circular opening at the bottom of the slot.

3. A jigsaw globe puzzle as defined in claim 1, characterized by a guide device for aiding in the solution of the puzzle removably carried inside the lower section of the shell, said guide device comprising a circular plate with slits therein extending inwardly from the periphery thereof, said slits defining segments of the plate, and segments of a plate hingedly connected to the slitted periphery of the plate forming continuations of said first-named segments, said plate and hinged segments having a world map on the top surface thereof, the countries of said world map colored in various colors corresponding to the colors of the strips and maps on the world map sections of the globe, the imperforate area of the plate having lines in continuation of said slits, said slits and lines being disposed on lines corresponding to the lines of longitude of a world map.

4. A jigsaw globe puzzle as defined in claim 3, wherein the hinged plate segments are collapsible underneath the first-named plate segments for storing the plate inside the lower section and wherein a handle protrudes from the center of the plate.

5. A jigsaw puzzle as defined in claim 1, wherein the slots in the shell have substantially dumbbell shapes.

References Cited in the file of this patent

UNITED STATES PATENTS

| | | |
|---|---|---|
| 1,381,957 | Anderson | June 21, 1921 |
| 1,629,582 | McClintock | May 24, 1927 |
| 2,011,058 | Krase | Aug. 13, 1955 |
| 2,877,570 | Starworth | Mar. 17, 1959 |